United States Patent
Shumate

(10) Patent No.: US 8,955,892 B1
(45) Date of Patent: Feb. 17, 2015

(54) HAULING DEVICE

(71) Applicant: Stephen D. Shumate, Antioch, TN (US)

(72) Inventor: Stephen D. Shumate, Antioch, TN (US)

(*) Notice: Subject to any disclaimer, the term of this patent is extended or adjusted under 35 U.S.C. 154(b) by 0 days.

(21) Appl. No.: 13/954,678

(22) Filed: Jul. 30, 2013

(51) Int. Cl.
*A01K 29/00* (2006.01)
*B62B 15/00* (2006.01)
*B65D 30/00* (2006.01)

(52) U.S. Cl.
CPC .............. *B62B 15/007* (2013.01); *B65D 29/00* (2013.01)
USPC ............................... 294/1.3; 280/19; 294/152

(58) Field of Classification Search
USPC ............. 280/19–20, 28.17; 294/1.1, 152, 1.5, 294/137; 15/257.1; 141/390; 248/95, 99
See application file for complete search history.

(56) References Cited

U.S. PATENT DOCUMENTS

| | | | |
|---|---|---|---|
| 2,974,971 A * | 3/1961 | Buck | 280/19 |
| 3,355,187 A | 11/1967 | Brindle | |
| 3,469,762 A * | 9/1969 | La Torre | 229/122 |
| 4,173,351 A | 11/1979 | Hetland | |
| 5,104,133 A | 4/1992 | Reiner | |
| 5,211,434 A | 5/1993 | Lanava | |
| 5,709,477 A * | 1/1998 | Schinasi et al. | 383/4 |
| 6,565,101 B2 * | 5/2003 | Jones et al. | 280/19 |
| 7,520,546 B2 * | 4/2009 | Monahan | 294/214 |
| 7,785,008 B2 | 8/2010 | Schoenig et al. | |

* cited by examiner

*Primary Examiner* — John Walters
*Assistant Examiner* — James Triggs
(74) *Attorney, Agent, or Firm* — Bradley Arant Boult Cummings, LLP

(57) ABSTRACT

A mat for gathering and hauling materials is herein disclosed. The mat has handles on either end for a user to easily grab and pull or carry. Additionally, the edges of the mat may be raised by securing dowels in the corners of the mat and raising the dowels perpendicular to the ground, as by pulling the dowel upward into a standing position.

10 Claims, 2 Drawing Sheets

US 8,955,892 B1

HAULING DEVICE

FIELD OF THE INVENTION

The invention relates generally to devices for hauling leaves, dirt, wood, gravel or rocks, lawn or other yard refuse, and tools over ground.

BACKGROUND ART

Tarps, wheelbarrows, and other similar devices are well known for use with hauling or carrying materials over ground. However, the prior art exhibits several deficiencies. Tarps lay flat on the ground, without any raised edge or "wall." Because they lack such walls, dirt, leaves, other refuse, and the like may shift off the tarp due to wind, uneven terrain, or moving the tarp about. Tarps also are large and flexible, making them difficult to transport when loaded down. Other devices, such as wheelbarrows or wagons that attempt to create such a wall are not easily collapsible for storing after use, because they are formed of rigid, non-flexible material. What is needed, then, is a device formed of a flexible but durable material that, when deployed, has walls for collecting refuse.

SUMMARY OF THE INVENTION

In some aspects, the invention relates to a device for hauling materials over ground, the device having a non-rigid mat constructed of durable waterproof material and having a front edge, two side edges, and a back edge; a handle attached to the front edge; two sleeves, each sleeve in a corner opposite from the first edge, the sleeve adapted to receive a dowel; two dowels, each dowel adapted to be inserted into a sleeve, such that when the dowels are set substantially perpendicular to the ground, adjacent edges of the mat are raised to form a flexible wall; two handles attached to the back edge, each handle positioned parallel to a sleeve; and a plurality of fasteners adapted to secure the handles to the ground.

In other aspects, the invention relates to a device for hauling materials over ground, the device having a mat; a handle attached to the front edge of the mat; and a dowel coupled to a corner of the mat, such that the dowel is substantially perpendicular to the ground and sides edges are raised when the device is in use.

In other aspects, the invention relates to a method for utilizing a hauling device, having the steps of spreading a mat over the ground, the mat having a front edge, a handle attached to the front edge, a plurality of corners, a plurality of sleeves, each sleeve positioned in a corner and adapted to receive a dowel, and a plurality of bands, each hand attached to a corner having a sleeve; inserting a dowel into a sleeve; pulling the band corresponding to a sleeve having a dowel taut, such that the dowel is substantially perpendicular to the ground; and fastening the band to the ground with a fastener.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
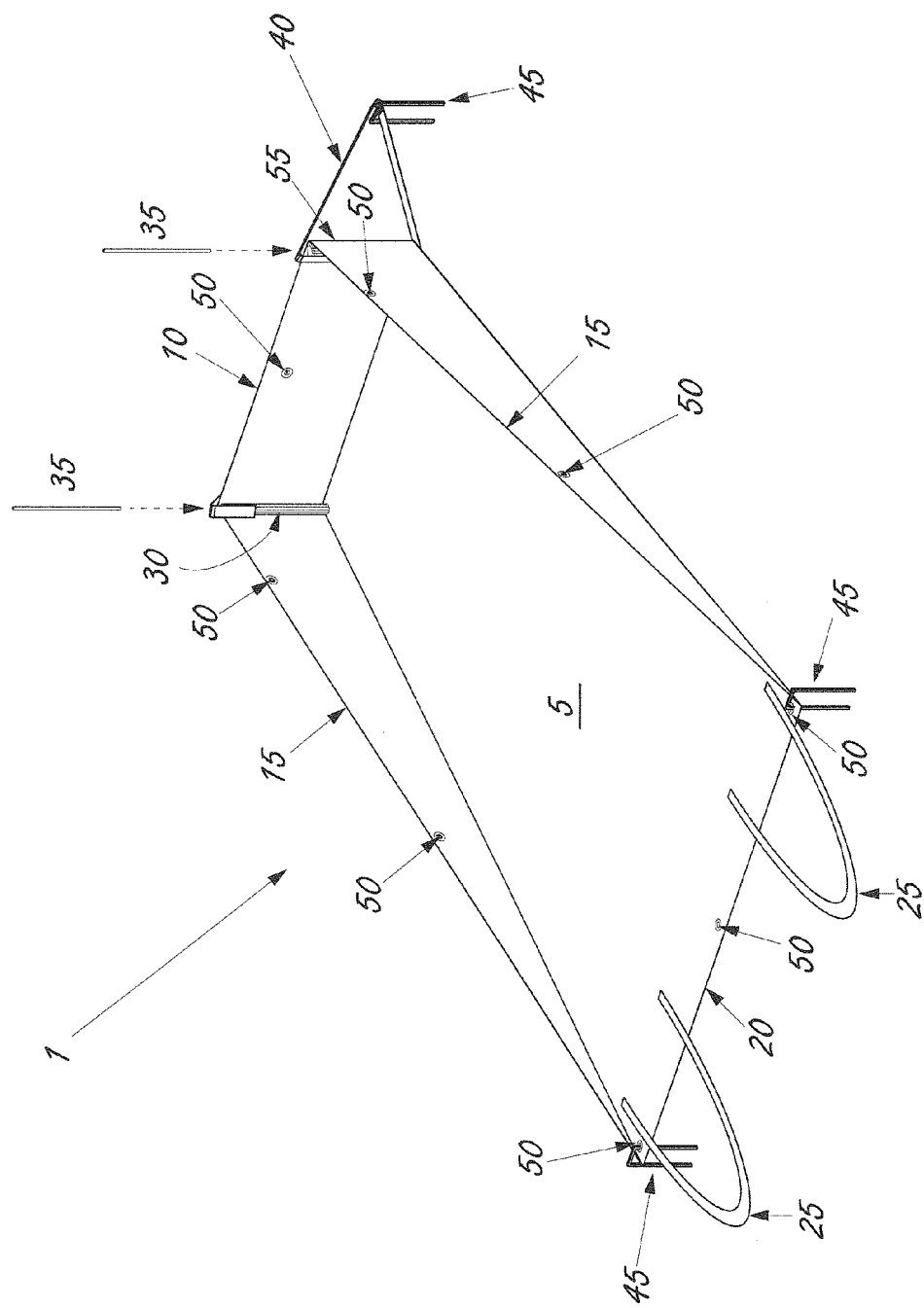
FIG. 1 is a perspective view of one embodiment of the invention.

FIG. 1 shows an overall depiction of one embodiment of the hauling device 1.

The device 1 is a large planar mat 5 having raised side edges 15 and a raised back edge 10, with handles 25 attached to the front edge 20. The mat 5 in the embodiment shown is rectangular, which allows the back corners 55 to be raised upward. However, other embodiments may be square, triangular, or some other polygonal form. Additionally, the edges 10, 15, and 20 may have a curved or other non-linear profile, or may be sloped as side edges 15 in the embodiment depicted in FIG. 1, without departing from the scope of this disclosure.

The mat 5 is formed of a flexible, durable material, such as nylon, vinyl, mesh, or polyethylene or other flexible plastic. The mat 5 is preferably waterproof or water resistant to prevent water damage to the hauling device 1 when used over moist or waterlogged ground. However, it is not necessary that the device be waterproof or water-resistant.

The back edge 10 of the mat 5 depicted in FIG. 1 is raised upward to form a wall. likewise, the side edges 15 are raised near the back edge 10 and slope down toward the front edge 20. Rigid dowels 35 are coupled to the corners 55 to support the side edges 15 and the back edge 10 in a raised position. The dowels 35 are substantially straight, rigid members that may stand upward to support the walls when the device 1 is in use. The dowels 35 are positioned in the corner between the side edge 15 and the back edge 10. One end of the dowel 35 is located in or near the corner, where a side edge 15, back edge 10, and the mat 5 come together, and the other end extends towards the middle of the mat 5. When raised, the dowel 35 stands substantially vertical to the ground, raising the side edge 15 and the back edge 10 into walls which meet in the corner where the dowel 35 is standing. When the dowel 35 is in a horizontal position or is removed, the side edge 15 and back edge 10 collapse down over the mat 5 for easy folding and storage. The embodiment of FIG. 1 depicts a rectangular mat 5 with two dowels 35. In embodiments where the mat 5 takes other shapes, more or less dowels 35 may be used, so long as each dowel 35 is set in a corner 55.

The dowel 35 may be coupled to the mat in any number of ways. For example, as depicted in FIG. 1, a sleeve 30 is formed on the surface of the mat 5 and has an open end in the corner 55 to receive the dowel 35. In this embodiment, the dowel 35 may be inserted by the user to support the side edges 15 and back edge 10, and then removed when the user is ready to store the device 1. Alternatively, the dowel 35 may be attached by VELCRO®, non-permanent adhesive, tied down, or otherwise fastened to the mat 5 in a manner that allows the dowel 35 to be easily decoupled from the mat 5.

Also alternatively, in other embodiments, the dowel may be permanently coupled to the mat 5, for example, by being affixed or fastened to the mat 5 with glue or mechanical fasteners such as staples, or being sewn into a closed sleeve or compartment in the corner 55. In such embodiments, the side edges 15 and back edge 10 may be lowered by laying the dowel 35 down parallel to the ground, without actually removing the dowel 35 from its attachment to the mat 5.

In some embodiments, as also depicted in FIG. 1, the dowel 35 is supported when standing by a band 40 attached to the back edge 10. In some embodiments, the band 40 is not rigid to allow for ease of storing. In such case, the band 40 is stretched away from the corner and held in place against the ground by a fastener 45, such as a bracket, lawn staple, stake, or other device for pinning the band 40 to the ground. By pulling the band 40 taut, the dowel 35 is pulled into a raised or standing position to support the edges forming walls. Additionally, the non-rigid band 40 may also act as a handle or grip when the device is being pulled or carried by a person.

However, in other embodiments, the band 40 may be rigid and in such a shape as to support the dowel 35 when the dowel is in a raised position.

As depicted in FIG. 1, the front edge 20 is not raised. This allows a user to roll, push, or rake leaves, lawn clippings, debris, and other refuse onto the mat 5 without being caught against the raised side edges 15 or back edge 10. Additionally one or more handles 25 may be attached to the front edge 20 to allow a person to drag or carry the device 1 once the mat 5 is filled with material to be carried about.

Figure 2A:
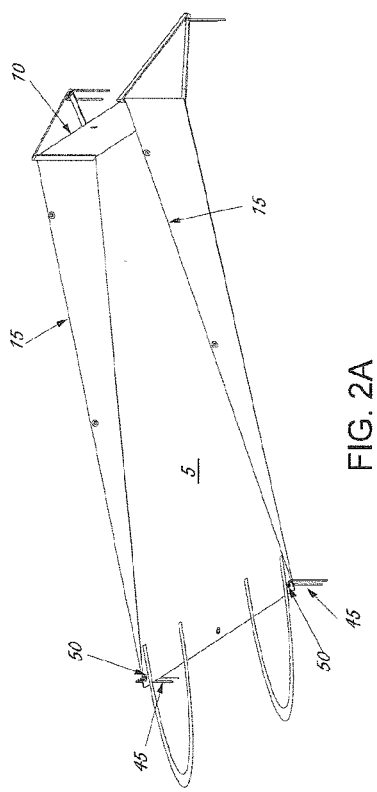
FIGS. 2A-2D are views of various configurations of one embodiment of the invention.

FIGS. 2A-2D depict alternative configurations for setting out the device 1. These configurations may be implemented by raising or lowering the side edges 15, back edge 10, or portions of a side edge 15 or back edge 10. This is done by placing a fastener 45, such as a bracket, stake, or staple, through small loops or grommets 50 spaced about the perimeter of the mat 5. The loops or grommets 50 may also be used with ties, ropes, or bungees (not depicted) to secure the load when the user is ready to transport it. FIG. 2A depicts the mat 5 in substantially the same configuration as depicted in FIG. 1.

Figure 2B:
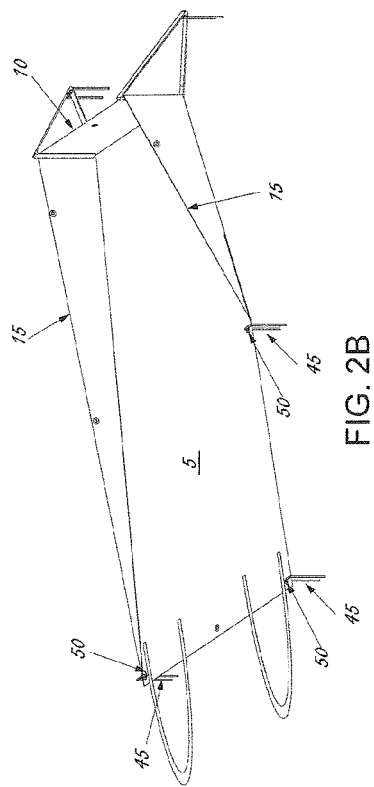

In FIG. 2B, one side edge 15 is secured to the ground by a fastener 45 through the grommet 50 located halfway along the edge. This shortens the raised portion of the side edge 15 to only half of the total side edge 15.

Figure 2C:
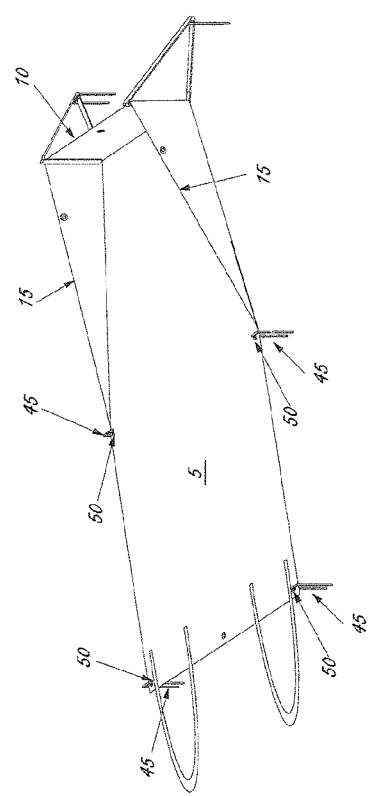

FIG. 2C depicts a configuration in which fasteners 45 are set through grommets 50 along both side edges 15. In this configuration, only half of each side edge 15 is raised, creating a large open section of the mat 5.

Figure 2D:
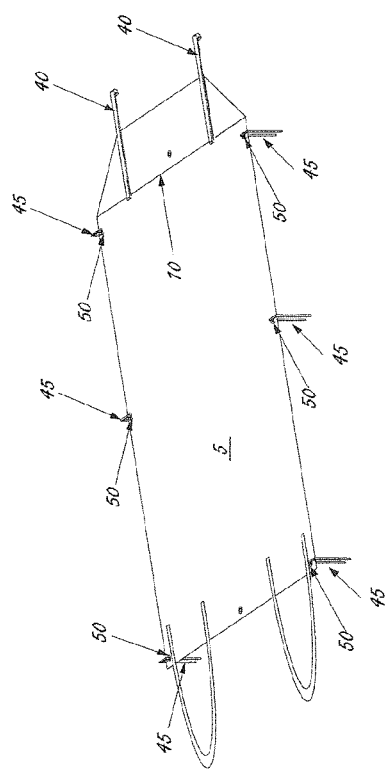

In FIG. 2D, both side edges 15 and the back edge 10 are lowered, and the mat 5 resembles a flat tarp on the ground. In this configuration, the bands 40 are laid flat on the ground, and the dowels 35 may be removed from the sleeves 30. In this manner, the back edge 10 and side edges 15 are allowed to lay flat on the ground.

Other configurations are also possible by placing fasteners through different grommets 50 around the perimeter.

To use the device 1, a user spreads the mat 5 out over the ground in a desired location. If the user intends to make use of the raised edges to form walls, one or more dowels 35 are inserted into the sleeves 30. To raise the dowels such that they support the side edges 15 and back edge 10, the user pulls the band 40 taut along the ground and secures it to the ground by a fastener 45. If the user desires to use alternative configurations as depicted in FIGS. 2A-2D, or any other configuration the user may find desirable, additional fasteners 45 may be placed through the appropriate grommets 50 to hold down the mat 5.

The user may then gather into the mat such lawn debris, clippings, leaves, or other refuse, and any other objects or materials that the user desires. After the user has completed the task, or the mat 5 is full, the user removes the fasteners 45 from the ground and may drag the mat 5 by the handles 25. Alternatively, one person may grab the handles 25, and a second person may grab the bands 40, and together the two may carry away the mat 5. To unload the mat 5, a user can simply pull on the bands 40 to dump the load onto the ground from the front of the mat 5.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

I claim:

1. A device for hauling materials over ground, the device comprising:
    a. a non-rigid mat constructed of durable waterproof material and having a front edge, two side edges, and a back edge;
    b. a handle attached to the front edge;
    c. two sleeves, each sleeve in a corner opposite from the first edge, the sleeve adapted to receive a dowel;
    d. two dowels, each dowel adapted to be inserted into a sleeve, such that when the dowels are set substantially perpendicular to the ground, adjacent edges of the mat are raised to form a wall;
    e. a band attached to the corner of the mat, such that when the band is pulled taut, the dowel is raised to a position substantially perpendicular to the ground; and
    f. a plurality of fasteners adapted to secure the mat to the ground.

2. A device for hauling materials over ground, the device comprising:
    a. a mat;
    b. a handle attached to the front edge of the mat;
    c. a dowel coupled to a corner of the mat; and
    d. a band attached to the corner of the mat,
such that when the band is pulled taut, the dowel is raised to a position substantially perpendicular to the ground and side edges of the mat are raised.

3. The device of claim 2 further comprising a sleeve set in a corner of the mat and adapted to receive a dowel.

4. The device of claim 2, wherein the dowel is detachable from the mat.

5. The device of claim 2, wherein the front edge is not raised when the plurality of dowels are set substantially perpendicular to the ground.

6. The device of claim 2, further comprising a plurality of grommets positioned about the perimeter of the mat, and a plurality of fasteners adapted to secure the grommets to the ground.

7. The device of claim 2, where the mat is formed of a non-rigid material.

8. A method for utilizing a hauling device, the method comprising:
    a. spreading a mat over the ground, the mat comprising
        i. a front edge,
        ii. a handle attached to the front edge,
        iii. a plurality of corners,
        iv. a plurality of sleeves, each sleeve positioned in a corner and adapted to receive a dowel, and
        v. a plurality of bands, each band attached to a corner having a sleeve;
    b. inserting a dowel into a sleeve;
    c. pulling the band corresponding to a sleeve having a dowel taut, such that the dowel is substantially perpendicular to the ground; and
    d. fastening the band to the ground with a fastener.

9. The method of claim 8, wherein the mat further comprises a plurality of grommets on the perimeter of the mat.

10. The method of claim 9, further comprising the steps of:
    a. inserting a fastener through at least one grommet; and
    b. securing the fastener in the ground.

* * * * *